United States Patent
Craig et al.

(10) Patent No.: US 6,400,721 B1
(45) Date of Patent: Jun. 4, 2002

(54) AUTOMATED NETWORK-WIDE DISTRIBUTION OF INFORMATION IN A DYNAMIC NETWORK ENVIRONMENT

(75) Inventors: Rob Craig, Nepean; Mark Grice, Stittsville; Felix Katz, Nepean; Arnold German, Kanata; Mike Holloway, Stittsville, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/083,128

(22) Filed: May 22, 1998

(51) Int. Cl.[7] .................................................. H04J 3/02
(52) U.S. Cl. ........................ 370/398; 370/244; 370/401; 370/422; 707/202
(58) Field of Search ................................ 370/243, 244, 370/245, 259, 395, 396, 401, 402, 422, 421, 420, 398; 379/201, 207, 269; 707/200, 201, 202

(56) References Cited

U.S. PATENT DOCUMENTS

| | | | | |
|---|---|---|---|---|
| 5,473,680 A | * | 12/1995 | Porter | 370/259 |
| 5,850,507 A | * | 12/1998 | Ngai et al. | 395/182.14 |
| 5,870,758 A | * | 2/1999 | Bamford et al. | 707/201 |
| 6,108,337 A | * | 8/2000 | Sherman et al. | 370/401 |

* cited by examiner

*Primary Examiner*—Douglas Olms
*Assistant Examiner*—Shick Hom
(74) *Attorney, Agent, or Firm*—Marks & Clerk

(57) ABSTRACT

A system and method of distributing information from a central source to network elements in a communications network. The central source or network manager is augmented by a distributor which maintains a record of all table entries or transactions originating at the central source. The distributor also maintains a dynamic record of all network elements including current status information and the last transaction successfully received thereby. Each table entry is assigned a transaction number (NextTN) which is incremented by one with each new transaction. The transaction last received by a network element is assigned a transaction number (LastTN) which is one less than NextTN. If an element has been temporarily out of service, upon its return to service its LastTN is compared with the source's current NextTN and if the difference is greater than one, the entries are update sequentially beginning with the table entry following its LastTN.

11 Claims, 1 Drawing Sheet

AUTOMATED NETWORK-WIDE DISTRIBUTION OF INFORMATION IN A DYNAMIC NETWORK ENVIRONMENT

FIELD OF THE INVENTION

This invention relates to a digital network including a plurality of distributed network elements receiving information from a central source and more particularly to a method and system for automatically distributing the information to the elements in a dynamic environment.

1. Background

Within a network such as an asynchronous transfer mode (ATM) backbone it is often required to maintain information at a central source, for example a network manager, while ensuring that each of the elements in the network is also kept up-to-date with the same information. If the importance of the information being maintained is high, it is necessary to ensure that this synchronization is guaranteed at all times.

Ideally, the information of the central source should be kept in sync on the network elements automatically. For example, if an element is added to the network it should be updated with the information as soon as the element becomes available. When elements in the network become temporarily unreachable and changes are made to the centralized information, the element should be updated when it becomes reachable again.

In large networks, with large volumes of centralized information, performance and network bandwidth are also key factors. The system must be able to respond quickly to network changes as well as distribute new or changed information to network elements quickly. The amount of information sent to the network elements should be kept as minimal as possible (so as not to waste bandwidth). In some applications the information must be delivered in the order in which it is entered into the central system.

2. Prior Art

One typical approach to solve this problem is by using tables to track which information has to be sent to each element in the network. If elements are temporarily unreachable a list of outstanding items for that element is maintained. However, in large networks with large volumes of information to distribute, these lists can become unmanageably large and can also hinder performance of the distributing system and of the network.

Another typical approach is to sacrifice network bandwidth by sending the entire central table of information each time a node must be updated. This removes the requirement to keep potentially large lists of information that need to be sent. However, in large networks with large volumes of information to distribute, this approach requires much more network bandwidth and can also hinder the performance of the distributor. Modifications to the central table(s) become prohibitive due to the network cost of distribution.

A third typical approach is to maintain the status of each element's synchronization at the element itself. This requires maintenance of status tables across the network and also suffers performance degradation and unnecessary bandwidth usage.

As an example, if the system were to keep a list for each node of (pointers to) those items that need to be sent to the node, in a network with 1,000 elements and 10,000 table entries if only 50 new table entries are added, 50,000 items must be maintained in the list, temporarily (i.e. 1000*50 = 50,000). If 5 new nodes are added to the network, the system must (temporarily) keep a list of 10,000*5 =50,000 items to distribute. In a more extreme case, if 1000 entries are added when the entire network is temporarily unreachable (for example, during a maintenance window) then 1000*1000=1,000,000 list items must be maintained.

SUMMARY OF THE INVENTION

The present invention is applicable to network environments where guaranteed synchronization of information at elements with a central source is required.

Using the approach described in this application, regardless of network conditions and during table modifications, the system always maintains the same number of information transactions or items as there are elements and table entries. In the above example, the system would always have 11,000 list items to keep track of (even if all 10,000 table entries are added when all 1000 elements are unreachable).

Therefore in accordance with a first aspect of the present invention there is provided a system for distributing information at a central source to network elements in a digital communication network. The system comprises distribution means associated with the central source for monitoring table entries originating at the source, storage means for recording details of the table entries and to provide a transaction numbers for each entry, means to monitor the current status of each network element, and means to record a transaction number for the last table entry having been received by each element, whereby a transaction numbering scheme is used to dynamically control distribution of table entries to each element in the network.

In accordance with a second aspect of the present invention there is provided a method of distributing information at a central source to elements within a distributed network. The method comprises the steps of: maintaining a list of table entries originating at the source; dynamically assigning a transaction number to each table entry; monitoring the status of each network element; maintaining a record of the last table entry received at each element; and distributing to each element, the table entries in a sequential manner according to a transaction number scheme.

BRIEF DESCRIPTION OF THE DRAWINGS

The invention will now be described in greater detail with reference to the attached drawings wherein.

DETAILED DESCRIPTION OF THE INVENTION

Figure 1:
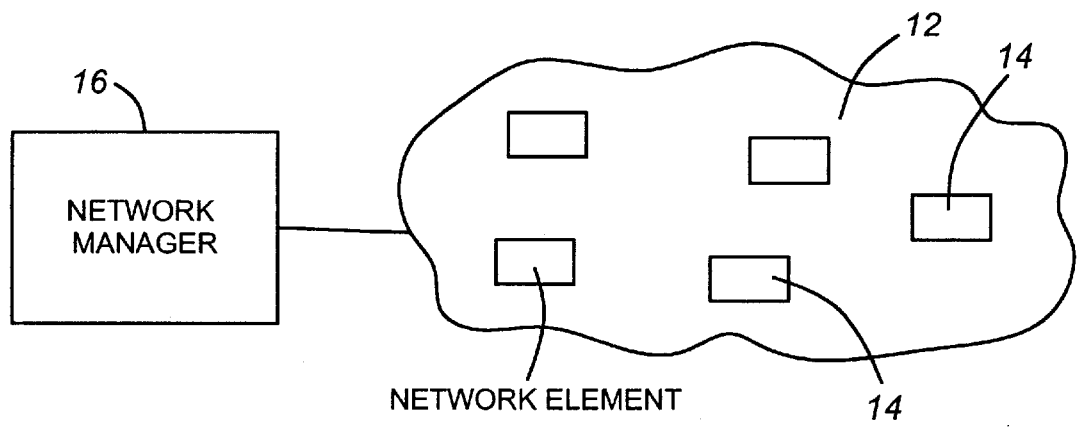
FIG. 1 is a high level diagram of a distributed network with a central source and a plurality of network elements.

As shown in FIG. 1 a typical distributed network 12 includes a plurality of network elements 14 which may be switches for example. Information pertaining to provisioning of network elements 14 is controlled at a central source such as a network manager 16. One such network manager is a Newbridge Network 46020.

Figure 2:
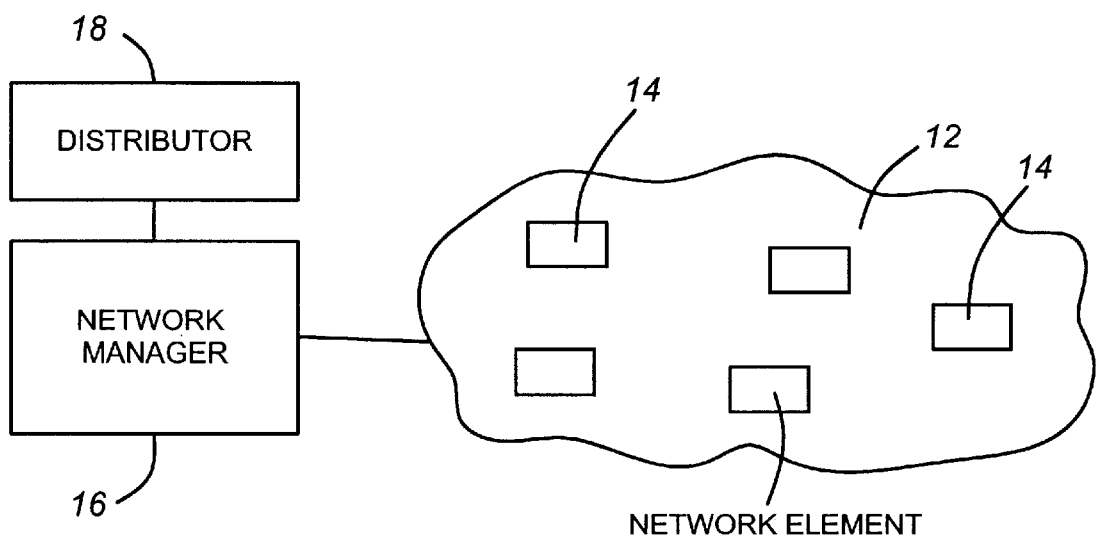
FIG. 2 shows the network of FIG. 1 with a distributor according to the present invention.

In FIG. 2 central source or network manager 16 is augmented with distributor 18 which according to the invention initiates a transaction number scheme for maintaining information relating to table entries and the dynamic status of network elements.

The basis of this invention is to provide a reliable, efficient mechanism for the distribution of information at a central source to each of the elements in a network. This mechanism must maintain performance and efficient network usage for large networks and large amounts of information. It must also handle, with minimum user intervention, the addition or removal of elements, reconfiguration of existing elements, and temporarily unreachable elements. This mechanism is referred to as the Distributor.

The two main entities the Distributor manages are network elements (the targets of distribution) and central table entries (the information being distributed). The Distributor keeps information on each network element as well as on each table entry. For the network elements the Distributor keeps a last transaction number (LastTN). This represents the last transaction (table entry) that was successfully sent to the node. For each table entry the Distributor keeps a transaction number (TN) which uniquely identifies that update to the table. Also, for the table itself the Distributor maintains a next transaction number (NextTN) which represents the next transaction number to use.

A new table is assigned NextTN=1, this indicates that the first transaction number to use for this table is 1. When a transaction is entered for the table, it is given a transaction number (TN) of the next available number for the table (NextTN). NextTN is then incremented.

Therefore, the first table entry is assigned the initial value of NextTN, which is TN=1, and the table's NextTN is incremented (NextTN=2). In this way, each following table entry is assigned the next transaction number (i.e., TN=2, TN=3, etc.) and NextTN keeps track of the next available transaction number. Any change to the table is considered an entry—so additions, deletions and modifications are each assigned a transaction number.

Each network element is initially assigned a last transaction number (LastTN) of 0, this indicates that it does not yet have any transactions distributed to it. The Distributor always sends transactions in order by TN, which is the same order they are input by the user since TNs are assigned as entries are input. As transactions are successfully sent to an element, it's LastTN is updated to the TN of the transaction just sent. Therefore, the LastTN of the network element corresponds to how far through the table entries the Distributor has gone for that element.

When an element becomes unreachable, the Distributor will suspend distribution until it again becomes reachable. However, when the element becomes reachable again the Distributor can continue right where it was, since it knows to send the transaction with TN number of LastTN+1 (the first table entry not yet sent to the element). Similarly, the Distributor knows if an element is up-to-date simply by comparing the node's LastTN value against the table's NextTN value. If NextTN is one greater than LastTN, the element is up-to-date.

Each of the Distributors actions are a result of some event (i.e., it is event-driven). This enhances performance by reducing lag time between events and distribution and because the Distributor never needs to poll for information, wasting needed resources. The user is free to maintain the central table as desired, and the Distributor keeps the network elements up-to-date with a minimum of user intervention.

An Example

For clarity, a simple example is provided to illustrate the algorithm. The Distributor maintains an internal representation of the network, keeping only the information pertinent to distribution. Two network elements (ElementA and ElementB) and two transactions (Tran1 and Tran2) are already configured in the network shown as below:

| Element  | LastTN | Transaction | TN |
|----------|--------|-------------|----|
| ElementA | 2      | Tran1       | 1  |
| ElementB | 2      | Tran2       | 2  |

NextTN = 3

Using a simple check, the Distributor knows that both network elements are up-to-date (since their LastTN is the same as the table's NextTN−1).

The user then modifies Tran1, which causes it's TN to be set to the next available TN (NextTN) and NextTN is incremented, as follows:

| Element  | LastTN | Transaction | TN |
|----------|--------|-------------|----|
| ElementA | 2      | Tran1       | 3  |
| ElementB | 2      | Tran2       | 2  |

NextTN = 4

The Distributor reacts to the transaction update and attempts to distribute transaction Tran1(TN=3) to all elements with LastTN less than 3 (both in this example). Assuming ElementB is unreachable at this point in time, the following state occurs:

| Element  | LastTN | Transaction | TN |
|----------|--------|-------------|----|
| ElementA | 3      | Tran1       | 3  |
| ElementB | 2      | Tran2       | 2  |

NextTN = 4

Next, a new element is added to the network, ElementC. New elements are assigned LastTN=0, therefore we have the following state:

| Element  | LastTN | Transaction | TN |
|----------|--------|-------------|----|
| ElementA | 3      | Tran1       | 3  |
| ElementB | 2      | Tran2       | 2  |
| ElementC | 0      |             |    |

NextTN = 4

The Distributor reacts to the event of ElementC being added, with LastTN=0, by sending each transaction, from TN=1 onward, in order to the element. Assuming this succeeds, we have:

| Element  | LastTN | Transaction | TN |
|----------|--------|-------------|----|
| ElementA | 3      | Tran1       | 3  |
| ElementB | 2      | Tran2       | 2  |
| ElementC | 3      |             |    |

NextTN = 4

Now, ElementB becomes reachable, the Distributor reacts to this event by sending it all transactions, in order, starting at it's LastTN+1 (in this case 3). After this succeeds we have the following state:

| Element | LastTN | Transaction | TN |
|---------|--------|-------------|-----|
| ElementA | 3 | Tran1 | 3 |
| ElementB | 3 | Tran2 | 2 |
| ElementC | 3 | | |

NextTN = 4

As in the beginning of this example, it can be seen that all elements are up-to-date because they all have a LastTN of NextTN−1.

The Distributor provides a robust mechanism for maintaining and guaranteeing synchronization of information between network elements and a central source. It provides an event-driven mechanism to efficiently distribute information while maintaining only a small amount of state information. This mechanism scales well to large networks and large amounts of data. Performance and network bandwidth requirements are maintained since only the necessary information is sent to network elements, and the Distributor has a simple, fast mechanism by which to determine if an element is up-to-date and which transaction to send next if it is not.

The addition of new elements is handled automatically in an event-driven manner, which reduces delay and the possibility of user-error, as are element deletions and modifications.

While a particular embodiment of the invention has been described and illustrated it will be apparent to one skilled in the art that numerous alternatives and variations can be implemented. It is to be understood, however, that such alternatives and variations will fall within the scope of the present invention as defined by the appended claims.

What is claimed is:

1. A system for distributing information from a central source to network elements in a digital communication network comprising: distribution means associated with the central source for monitoring table entries originating at the source; storage means for recording details of the table entries and to provide transaction numbers for each entry; means to monitor the current status of each network element and means to record a last table entry having been received by each element; and a transaction numbering scheme to dynamically control distribution of information transactions to network elements whereby upon initialization each element is identified by a first transaction number and each table entry is identified by a second transaction number representing a next available transaction number, greater than the first transaction number by one.

2. The system as defined in claim 1 wherein said table entries include provisioning instructions to said network elements.

3. The system as defined in claim 2 wherein said central source is a network manager.

4. The system as defined in claim 1 wherein each network element is assigned the number of a last transaction to have been received thereby=LastTN.

5. The system as defined in claim 4 wherein a network element which is unreachable during an unspecified interval receives any new table entries in sequence beginning from its LastTN upon returning to service.

6. A method of distributing information from a central source to network elements in a distributed network comprising the steps of:

maintaining a first logical structure which identifies each individual network element and provides an associated first transaction number which represents a last information transaction sent to said network element;

maintaining a second logical structure which identifies, by a second transaction number, an information transaction to be distributed to said elements, said second transaction number representing a next information transaction to be sent by said central source;

comparing said first and second transaction numbers and based on said comparison sending said next information transaction to each network element having a second transaction number which is higher by one that said first transaction number; and updating said first transaction number.

7. The method as defined in claim 6 wherein if one of said network elements becomes unreachable each information transaction is stored until said network element is again reachable at which time each stored information transaction is sent to said network element.

8. The method as defined in claim 6 wherein when a new network element is joined to the distributed network it is automatically sent all information transactions that have been sent to other network elements in the network.

9. The method as defined in claim 6 wherein information distribution is synchronized throughout the distributed network.

10. A system for distributing information from a central source to distributed network elements in a distributed network comprising:

a distributor for maintaining first and second logical structures wherein said first logical structure identifies each individual network element and provides an associated first transaction number which represents a last information transaction sent to said network element, and second logical structure identifies, by a second transaction number, an information transaction to be distributed to said elements, said second transaction number representing a next information transaction to be sent by said central source;

means to compare said first and second transaction numbers and based on said comparison send said next information transaction to each network element having a second transaction number which is higher by one that said first transaction number; and means to increment said first transaction number.

11. The system as defined in claim 10 wherein said distributor is scalable in order to provide distribution of information to large distributed networks.

* * * * *